(12) United States Patent
Hillebrand et al.

(10) Patent No.: US 6,565,722 B1
(45) Date of Patent: May 20, 2003

(54) INSTALLATION AND METHOD FOR MULTILAYERED IMMERSION COATING

(75) Inventors: Ernst-Walter Hillebrand, Wickede (DE); Gerhard Brendel, Auerbach (DE)

(73) Assignees: Walter Hillebrand GmbH & Co. KG, Wickede (DE); Nutro Maschinen-und Anlagenbau GmbH & Co. KG, Nurembuurg (DE)

( * ) Notice: Subject to any disclaimer, the term of this patent is extended or adjusted under 35 U.S.C. 154(b) by 0 days.

(21) Appl. No.: 09/744,623
(22) PCT Filed: Jul. 28, 1999
(86) PCT No.: PCT/EP99/05410
  § 371 (c)(1),
  (2), (4) Date: Mar. 21, 2001
(87) PCT Pub. No.: WO00/06810
  PCT Pub. Date: Feb. 10, 2000

(30) Foreign Application Priority Data

Jul. 29, 1998 (DE) .......................................... 198 34 245

(51) Int. Cl.[7] .............................................. C25D 17/00
(52) U.S. Cl. .............. 204/198; 204/297.07; 204/297.08
(58) Field of Search ................................. 205/170, 176, 205/178; 204/484, 486, 487, 198, 297.06, 297.07, 297.08

(56) References Cited

U.S. PATENT DOCUMENTS

| 3,626,845 A | * | 12/1971 | Whitaker ..................... 101/93 |
| 3,674,671 A | * | 7/1972 | Stromberg ................... 204/181 |
| 3,694,336 A | * | 9/1972 | Fiala ........................... 204/181 |
| 3,819,501 A | * | 6/1974 | Faust .......................... 204/198 |
| 3,934,830 A | * | 1/1976 | Grau ....................... 242/18 DD |
| 3,951,776 A | * | 4/1976 | Eibl et al. .................... 204/299 |
| 4,331,230 A | * | 5/1982 | Buckley ...................... 198/484 |
| 4,608,320 A | * | 8/1986 | Mochizuki et al. ......... 428/629 |
| 4,846,335 A | * | 7/1989 | Hartlepp ..................... 198/365 |
| 5,054,600 A | * | 10/1991 | Blankemeyer et al. ... 198/354.2 |
| 5,150,781 A | * | 9/1992 | Deisenroth et al. ...... 198/349.8 |
| 5,331,913 A | * | 7/1994 | Tanaka et al. .............. 114/259 |
| 5,368,702 A | * | 11/1994 | de Nora ....................... 204/67 |
| 5,382,335 A | * | 1/1995 | Jirenec et al. ........... 204/144.5 |
| 5,541,445 A | * | 7/1996 | Quellet ....................... 257/634 |
| 5,615,395 A | * | 3/1997 | Komaki et al. ................ 396/6 |
| 5,680,746 A | * | 10/1997 | Hornisch ...................... 53/475 |
| 5,844,873 A | * | 12/1998 | Aoyama et al. ........... 369/75.2 |

FOREIGN PATENT DOCUMENTS

| DE | 41 42 997 | 1/1993 |
| DE | 44 28 789 | 5/1995 |
| FR | 2 474 348 | 7/1981 |
| WO | 98/44170 | 10/1998 |

* cited by examiner

*Primary Examiner*—Donald R. Valentine
(74) *Attorney, Agent, or Firm*—Merchant & Gould P.C.

(57) ABSTRACT

A method for multilayered coating, whereby hurdles for the item that is to be treated are guided for galvanic dip coating (2) through in a separate circuit. Downstream from the tank, the hurdles are changed over (12) and the item that is to be treated is guided in another hurdle for electrophoretic coating through a tank (4) in another separate circuit.

25 Claims, 16 Drawing Sheets

INSTALLATION AND METHOD FOR MULTILAYERED IMMERSION COATING

RELATED APPLICATIONS

This application is an application under 35 U.S.C. §371 of PCT/EP99/05410 filed on Jul. 28, 1999, which claims priority to German application 198 36 245.4 filed on Jul. 29, 1998.

FIELD OF THE INVENTION

The invention relates to a process and an installation for multiple coating, in which the material to be treated is passed through baths in which it is treated chemically, by electrodeposition and/or by electrophoresis.

BACKGROUND OF THE INVENTION

Processes and devices of this type are used to provide objects which at least partially comprise a conductive material with a surface whose technical or optical properties are adapted to the specific intended use. This can be achieved by chemical or electrochemical treatment of the surface, for example chromating of the surface of a metallic workpiece, and by electrolytic or electrophoretic application of a topcoat.

The known wet processes involve a very high level of outlay, since the material to be treated has to be passed through a series of vessels which are arranged in succession and contain a very wide variety of treatment liquids, for example cleaning agents, electrolytes and electrodip coatings. This takes place in continuous throughput installations with conveyors which move the material being treated from dip tank to dip tank through a treatment line.

Since large pieces of material to be treated can be guided individually and small pieces, with a view to achieving a homogeneous surface, can only be guided with a limited bed height through the individual baths, conventional installations are extraordinarily complex and have a relatively low throughput.

A particular problem is that of achieving a surface treatment which is uniform in all parts, for example a full-area electrodeposition and/or coating without flaws. Flaws of this type result in particular at the contact points between the material being treated and the conveying means for transporting the material being treated through the individual baths.

SUMMARY OF THE INVENTION

The invention is based on the problem of improving the economics of the known processes and devices for multiple coating without impairing the surface quality of the material being treated.

The solution to this problem consists in a process in which trays holding the material being treated are guided, with the aid of a plurality of conveyors, along a circuit from treatment station to treatment station and through the individual bath vessels for coating by electrodeposition or electrophoresis as well as through any pretreatment and subsequent treatment vessels. This takes place in two separate circuits which the material being treated passes through in succession, while the trays in each case only pass through one circuit. This means that a tray change is required when the material being treated is transferred from one circuit into the other.

The material being treated is initially pretreated on an electrodeposition tray and is then provided with an undercoat, for example of a zinc-nickel alloy, by electrodeposition, followed by subsequent treatment, for example chromating, conversion coating or passivation. It then leaves the first circuit and is transferred to another tray or into the second circuit, in which a topcoat is applied by electrophoresis, and after the coating operation the material being treated is usually dried. After the drying, the coating trays can be unloaded, cleaned and then again supplied with the material being treated from the first circuit.

During the coating, the trays are preferably moved horizontally between the upper and lower anodes or cathodes; this may take place continuously. Preferably, however, the electrodeposition and coating trays are guided in steps at least through the individual bath vessels.

The process according to the invention can particularly advantageously be carried out in an installation which comprises a plurality of tray conveyors. These conveyors are arranged in two groups, in each case in such a way that they form a closed circuit for the trays. The two circuits are connected to one another via a tray changer in which the material being treated passes from the electrodeposition circuit into the coating circuit or is transferred from an electrodeposition tray to a coating tray which guides the material being treated through a bath vessel, a dryer, if appropriate with a cooling zone, and preferably through an unloading station and/or a cleaning station.

The basis of the tray conveyors in the bath vessels is preferably formed by a lifting and displacement frame which moves the trays in steps through the vessels. The drive required for this purpose may comprise a pushing cylinder and a lifting cylinder which, by means of a finger, engages in a slot in the lifting and displacement frame. In this way, it is possible for a plurality of trays which have been placed in each case on a support, for example bearing rails, to be picked up simultaneously and moved a distance forwards and then put back down again.

The trays preferably have lateral bearing arms, by means of which they are supported on bearing rails which simultaneously supply the current to the trays and therefore to the material being treated. Grippers which are connected to the lifting and displacement frame and with the aid of which the trays on the bearing rails are moved, for example pushed, from one position to the next position, are able to act on these bearing arms. To ensure a coating which is as uniform and continuous as possible, the trays preferably move between anodes or cathodes arranged above and below them during the coating by electrodeposition and/or electrophoresis.

To prevent the formation of arcs and resultant burning during contacting, the installation may be equipped with two groups of contacts which are each closed alternately and in this way ensure uninterrupted supply of current to the trays. To make this possible, the vessel may be equipped with two groups of contacts. One group is fixedly connected to the lifting and displacement frame and therefore moves with the frame from position to position, while the other group of movable contacts is arranged in a stationary position, for example fixed to the vessel.

A tray from a frame with cross-bars and an electrically conductive head wire with an exposed contact strip on which the material being treated rests is particularly suitable for the electrodeposition. The tray may consist entirely of an electrically conductive material; in this case, with the exception of the contact strip, it has an electrically insulating coating.

On the other hand, however, the trays may also have a sawtooth bearing edge for the material being treated. A tray of this type is described in German patent 41 42 997, the content of which is deemed to form part of the present description.

The pallet changer preferably has linear bearing means, which can be displaced along a bridge and are preferably arranged in a carriage, above a lifting bench or a tray conveyor.

The conveyor may also have a lifting and displacement frame, on which in each case one arm of a plurality of two-armed angled levers engages, the other arms of which levers are connected to one another via a linkage. The lifting and displacement frame as well as one of the angled levers may each be provided with a dedicated drive, for example may be connected to in each case one hydraulic cylinder. Gripper arms, which are connected to the lifting and displacement frame, for the trays and bearing rails, which are arranged in the vessel, for the trays may be provided with contact pins for receiving the trays, so that the trays are always energized either via the gripper arm pins or via the bearing rail pins.

In order for the trays to be introduced and removed, the bath vessels or their lifting and displacement frames are preferably equipped with a tray manipulator, which may be equipped with a displaceable tilting table and a holding-down device for the material to be treated.

Finally, the coating conveyor may also run through an unloading station with linear bearing means, which can be moved in between the bearing elements or cross-bars of the trays, and an unloading station rake which can be displaced along the linear bearing means, and/or a cleaning station with driven cleaning spatulas or displaceable cleaning heads.

The invention is explained in more detail below with reference to exemplary embodiments which are illustrated in the drawing, in which:

DETAILED DESCRIPTION OF THE INVENTION

Figure 1:
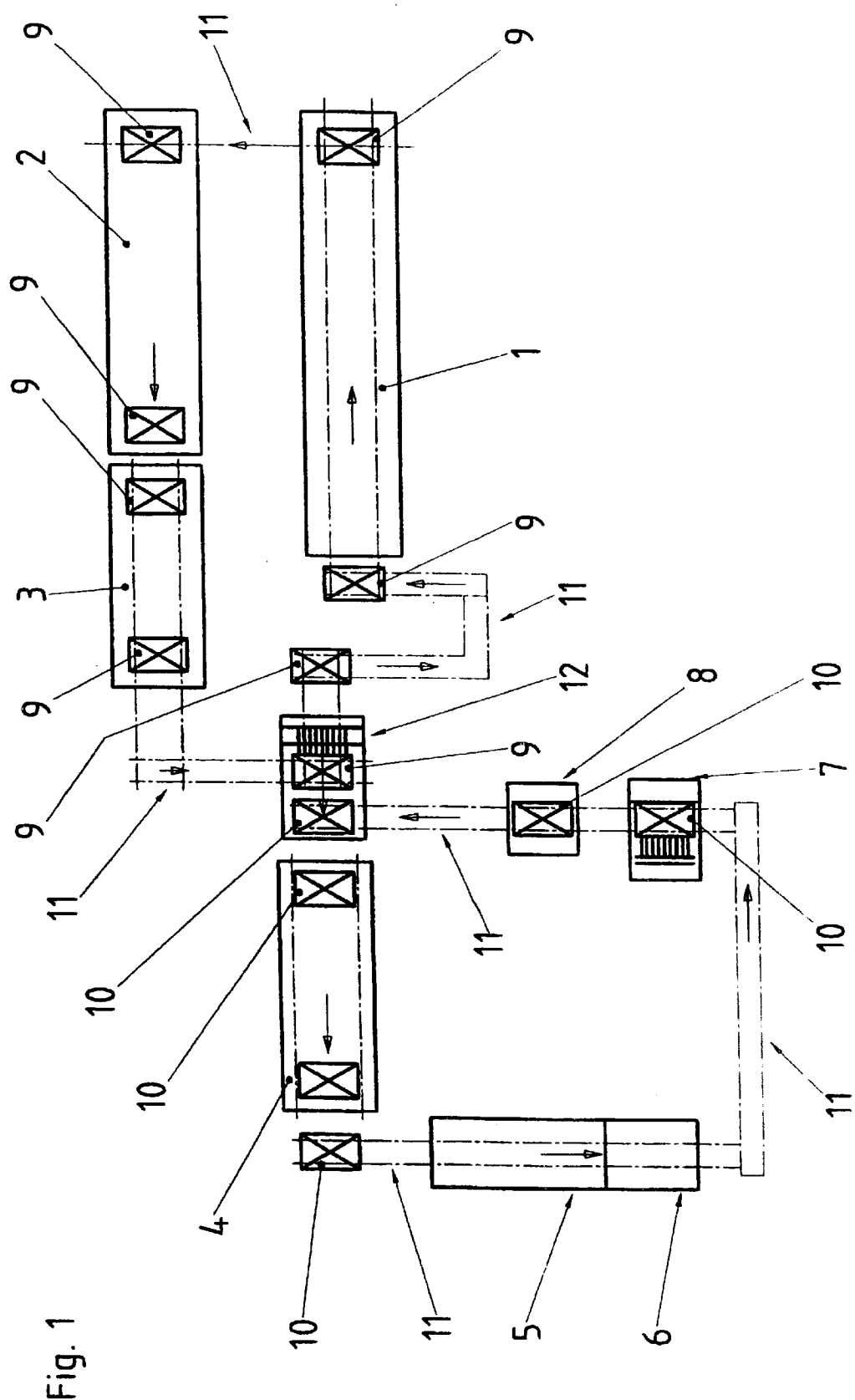
FIG. 1 shows a plan view of an installation for applying an undercoat and a topcoat to the material being treated.

The installation comprises two circuits, namely an electrodeposition circuit with a bath vessel 1 for pretreatment, a bath vessel 2 for coating by electrodeposition and a bath vessel 3 for subsequent treatment of the material being treated, which is moved through the bath vessels 1, 2, 3 on trays. The other circuit comprises a bath vessel 4 for coating by electrophoresis and a dryer 5 with a cooling zone 6, an unloading station 7 and a cleaning station 8.

The material to be treated is moved through the two circuits on trays 9, for one circuit, and 10, for the other circuit; this is achieved with the aid of tray conveyors 11 which connect the individual stations 1, 2, 3 and 4, 5, 6, 7, 8 of the installation to one another. The conveyors may be conventional chain, belt or plate conveyors, while special tray conveyors are arranged in the bath vessels.

The two circuits are connected to one another via a tray changer 12 which transfers the material being treated from the pallets 9 of the electrodeposition circuit to the pallets 10 of the coating circuit.

In the vessel 2 there are an upper anode 13 and a lower anode 14, between which the trays 9 are guided. This takes place with the aid of a lifting and displacement frame 15, on which a horizontal pushing cylinder 16 which is fixed to the vessel acts directly and a lifting cylinder 17, which is likewise fixed to the vessel, acts indirectly via a pivot lever fixed to the vessel. The pivot lever 18 is connected in an articulated manner to a further pivot lever 20, fixed to the vessel, via a connecting rod 19. The two pivot levers 18, 20 each engage, by means of a finger 21, 22, in a longitudinal slot 23, 24 in the lifting and displacement frame 15. The frame 15 is provided with gripper arms 25, which are arranged in pairs, and in each case one contact pieces 26 which is situated between the gripper arms, is vertically movable and is spring-mounted.

The upper anodes 13 are supplied with current via a bridge structure 27, while the lower anodes 14 have a power supply which is not shown.

The trays 9 have vertical bearing arms 29 with S-shaped holding pieces 30 made from copper, by means of which they are supported hanging from bearing rails 31 of the vessel. The bearing arms 29 serve as supply conductors and are in contact either with the vertically movable contact pieces 26 on one side of the bath vessel 2 or pivotable contact pieces 32 on the other side of the bath vessel. The pivotable contact pieces 32 are situated at that end of an approximately U-shaped angled lever 33 which is pivotably mounted at 34 and are actuated by a pivoting cylinder 35.

Figure 2:
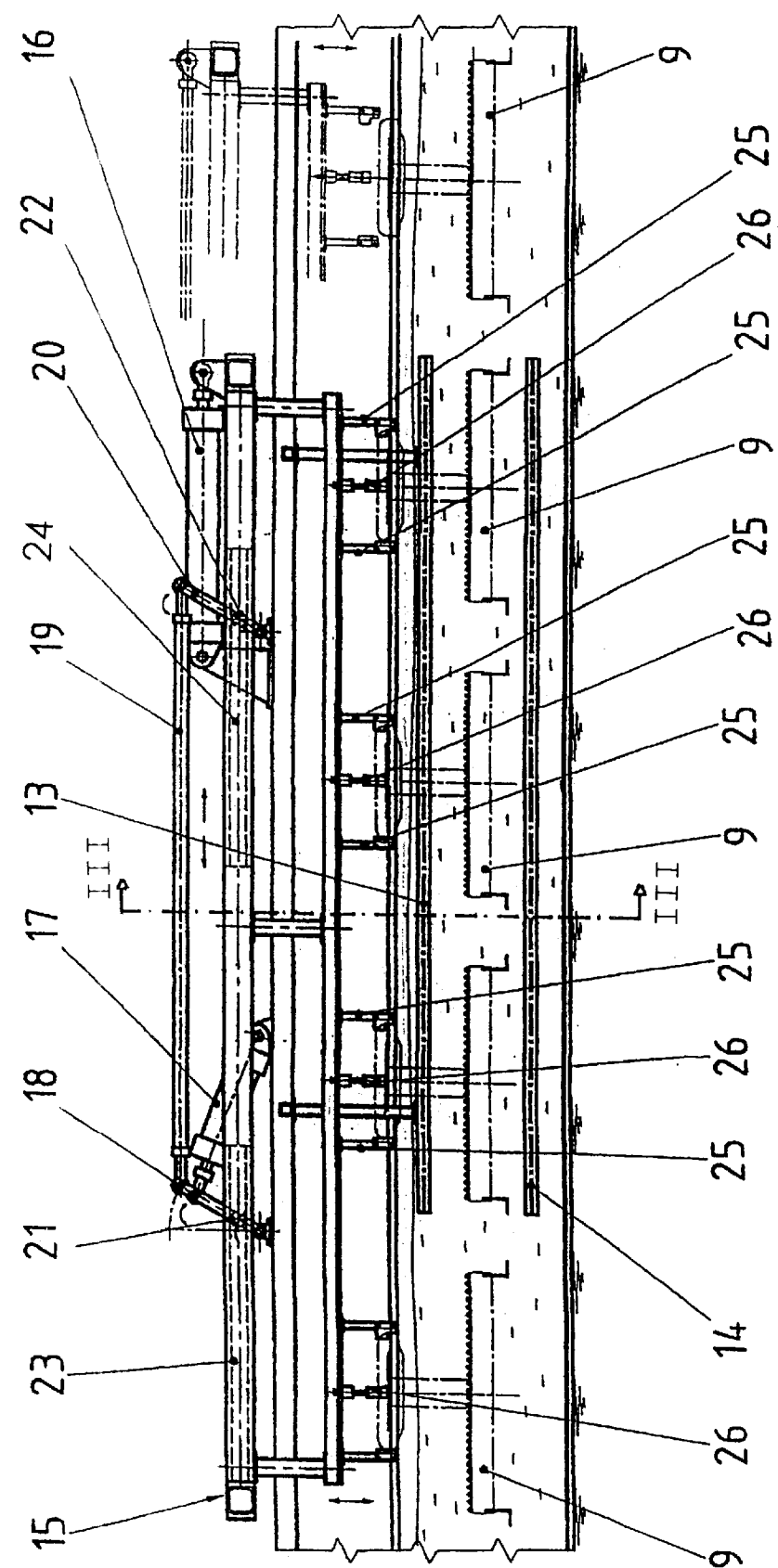
FIG. 2 shows a side view of a lifting and displacement frame in a bath vessel.
Figure 3:
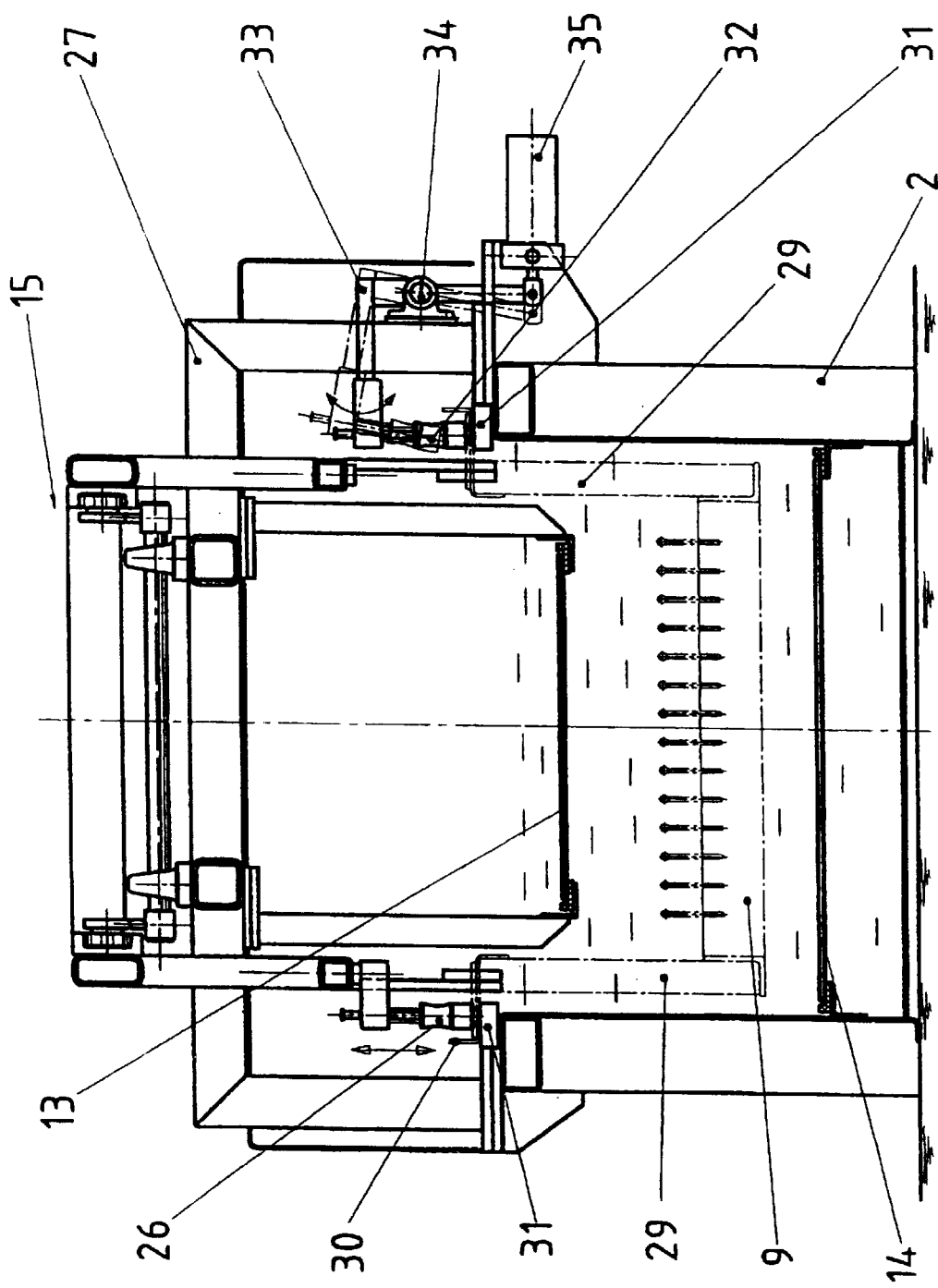
FIG. 3 shows a cross section through the bath vessel shown in FIG. 2, on line III—III.
Figure 4:
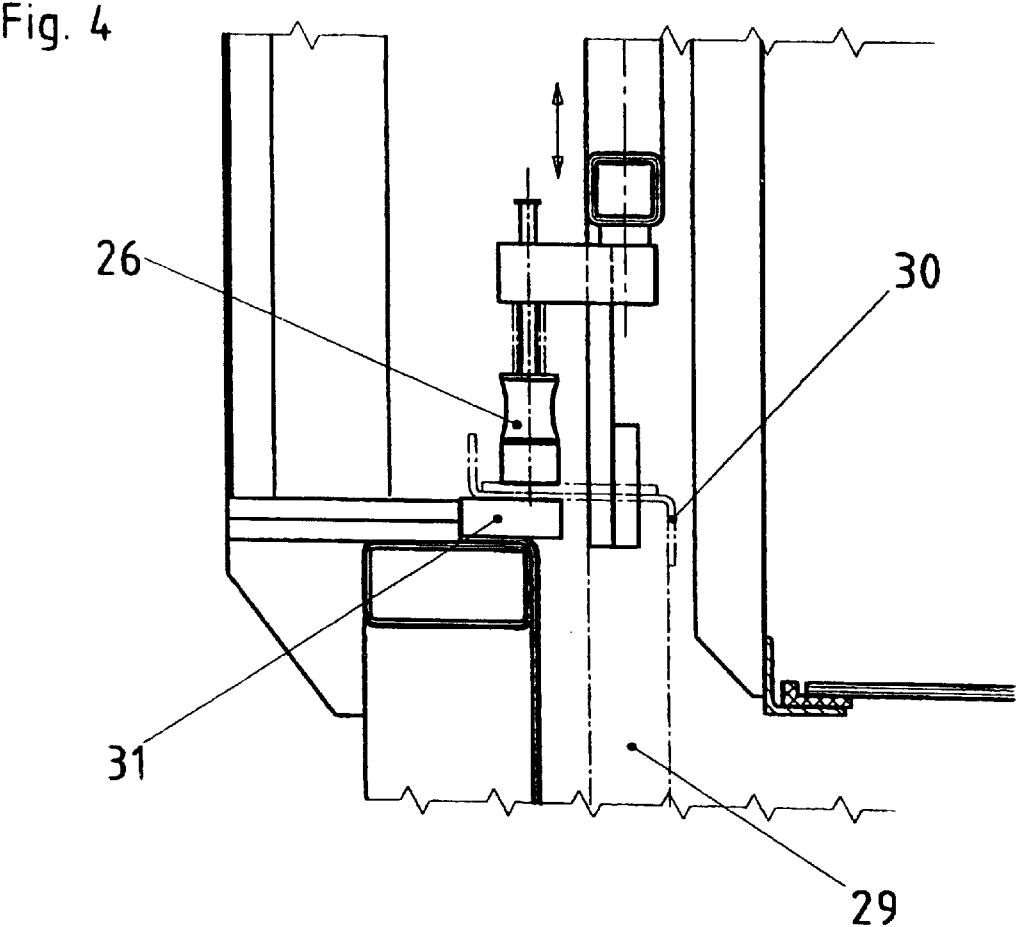
FIG. 4 shows an enlarged view of a part of the lifting and displacement frame with a contact which is fixed to the frame.
Figure 5:
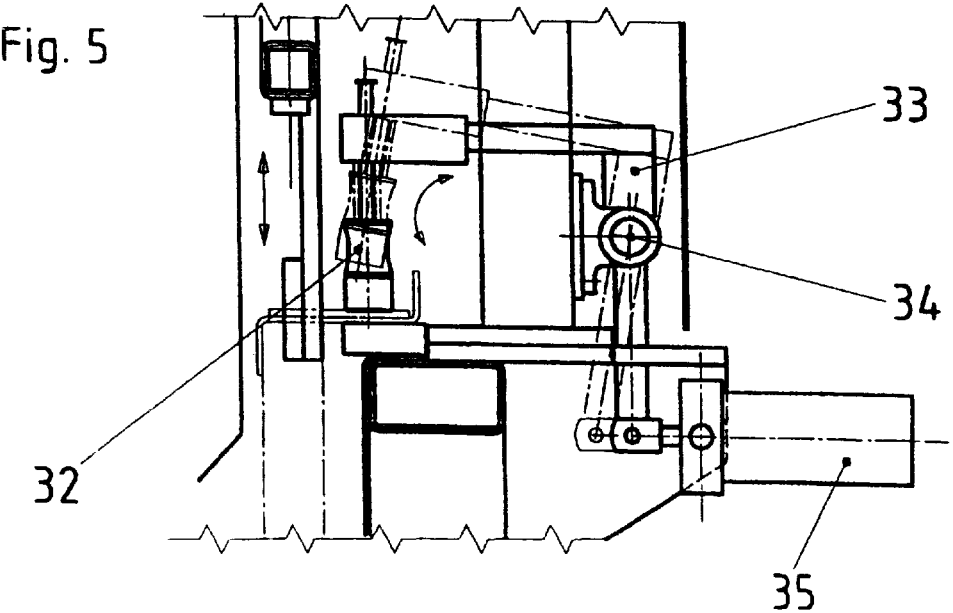
FIG. 5 shows an enlarged view of a part of the bath vessel with a contact fixed to the vessel.

In their lowered position, the gripper arms 25 take hold of the contact pieces 30 of the holding arms 29 and, during the pushing cylinder stroke, push them along the conductor rails 31 from one position to another. When a position has been reached, the pivoting cylinders 35 are actuated and the contact pieces 32 come into contact with the oppositely located contact pieces 30 of the holding arms 29. As soon as this has happened, the piston rod of the pushing cylinder 16 is extended and, at the same time, the lifting cylinder 17 is actuated, so that the gripper arms 15 come off the contact pieces 30 of the holding arms 29. At the same time, the contact pieces 26 cease to be in contact with the oppositely located contact pieces 30 of the holding arms 29. However, this does not interrupt the supply of current to the trays, since, during the movement of the lifting and displacement frame to the right in FIG. 2, the stationary contact pieces 32 are in contact with the oppositely located contact pieces 30 of the holding arms 29.

Figure 6:
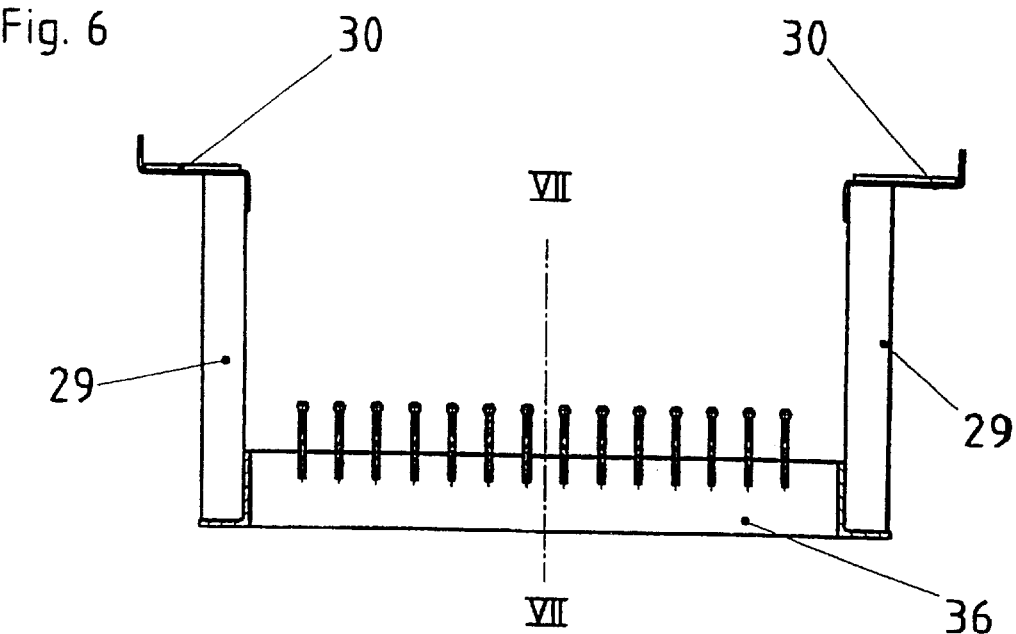
FIG. 6 shows a vertical section through a tray.
Figure 7:
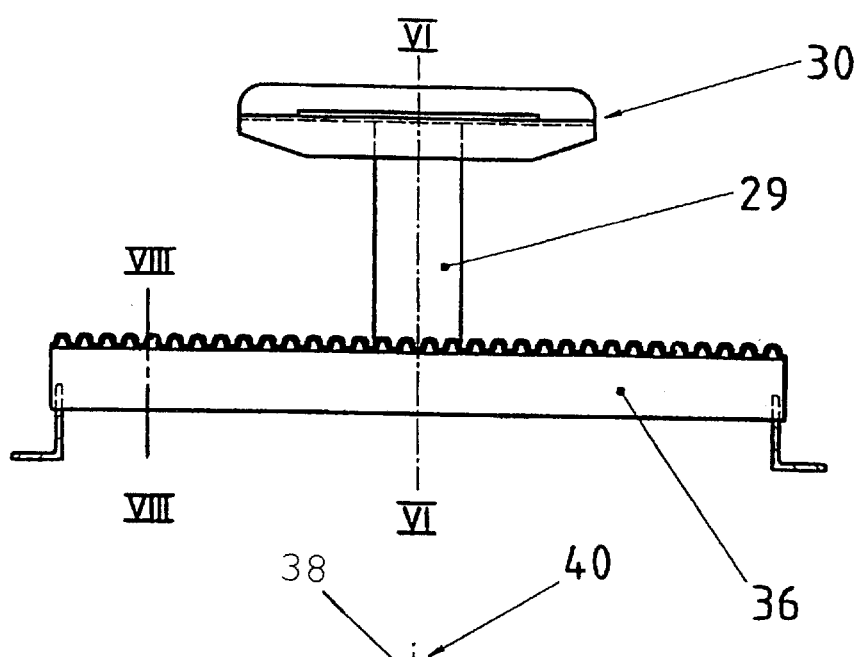
FIG. 7 shows a section through the tray shown in FIG. 6, on line VII—VII.
Figure 8:
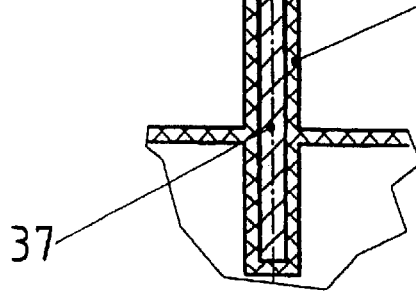
FIG. 8 shows an enlarged view of part of the tray shown in FIGS. 6 and 7.

The tray 9 illustrated in FIGS. 6 to 8 comprises a frame 36, from which the holding arms 29 with the contact pieces 30 extend upward. Cross-bars 37, the upwardly facing free ends of which are provided with a contact wire 38, are arranged in the frame. The frame 36 and the cross-bars, and also the contact wire, like the holding arms 29, have a rubber electrical insulation 39, which, however, leaves a contact strip 40 exposed on the wire 38. The material being treated rests on the contact wires 38 and is thus supplied with current via the contact strips 40.

Figure 9:
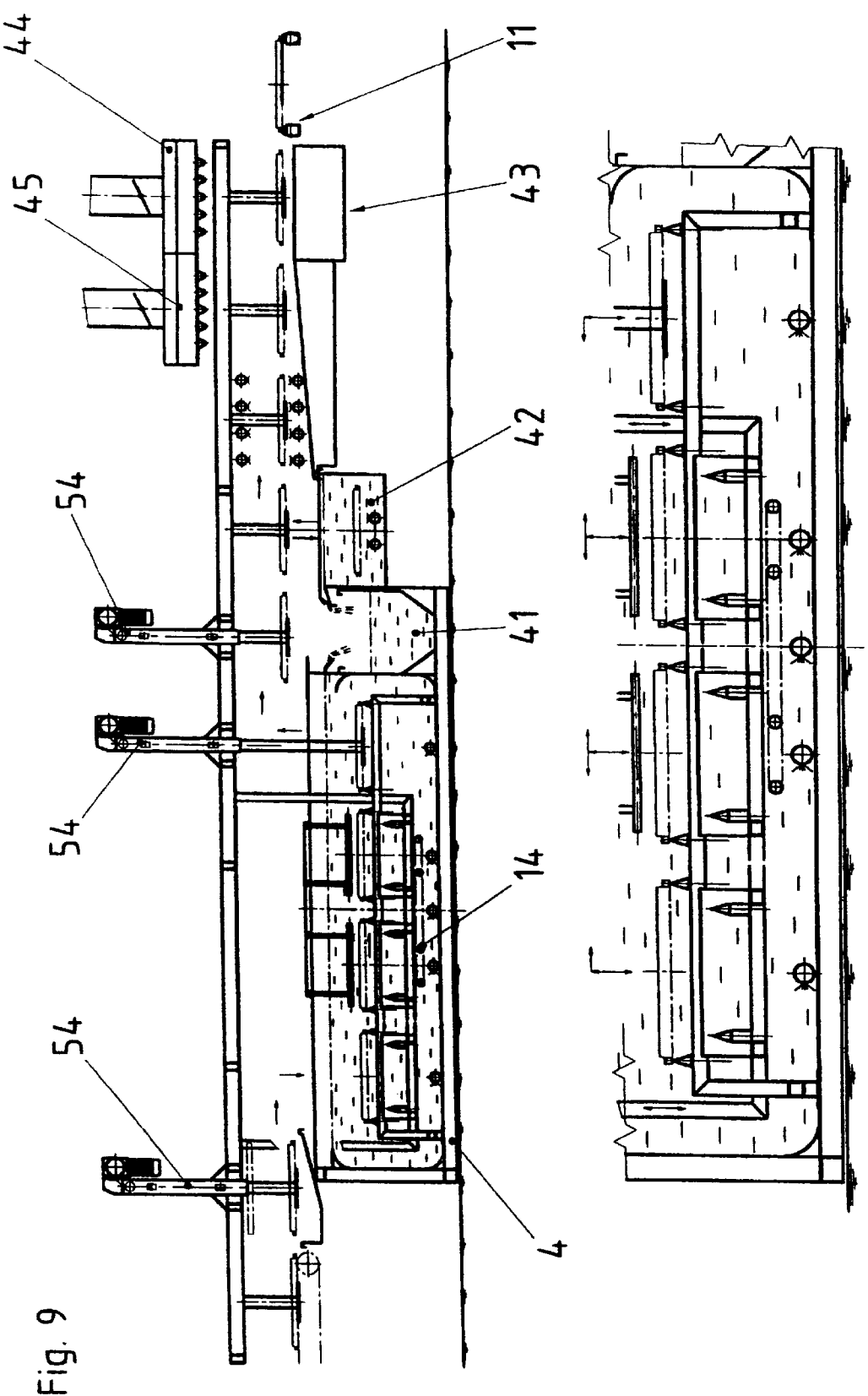
FIG. 9 shows a diagrammatic illustration of a bath vessel for applying a topcoat by electrophoresis.
Figure 10:
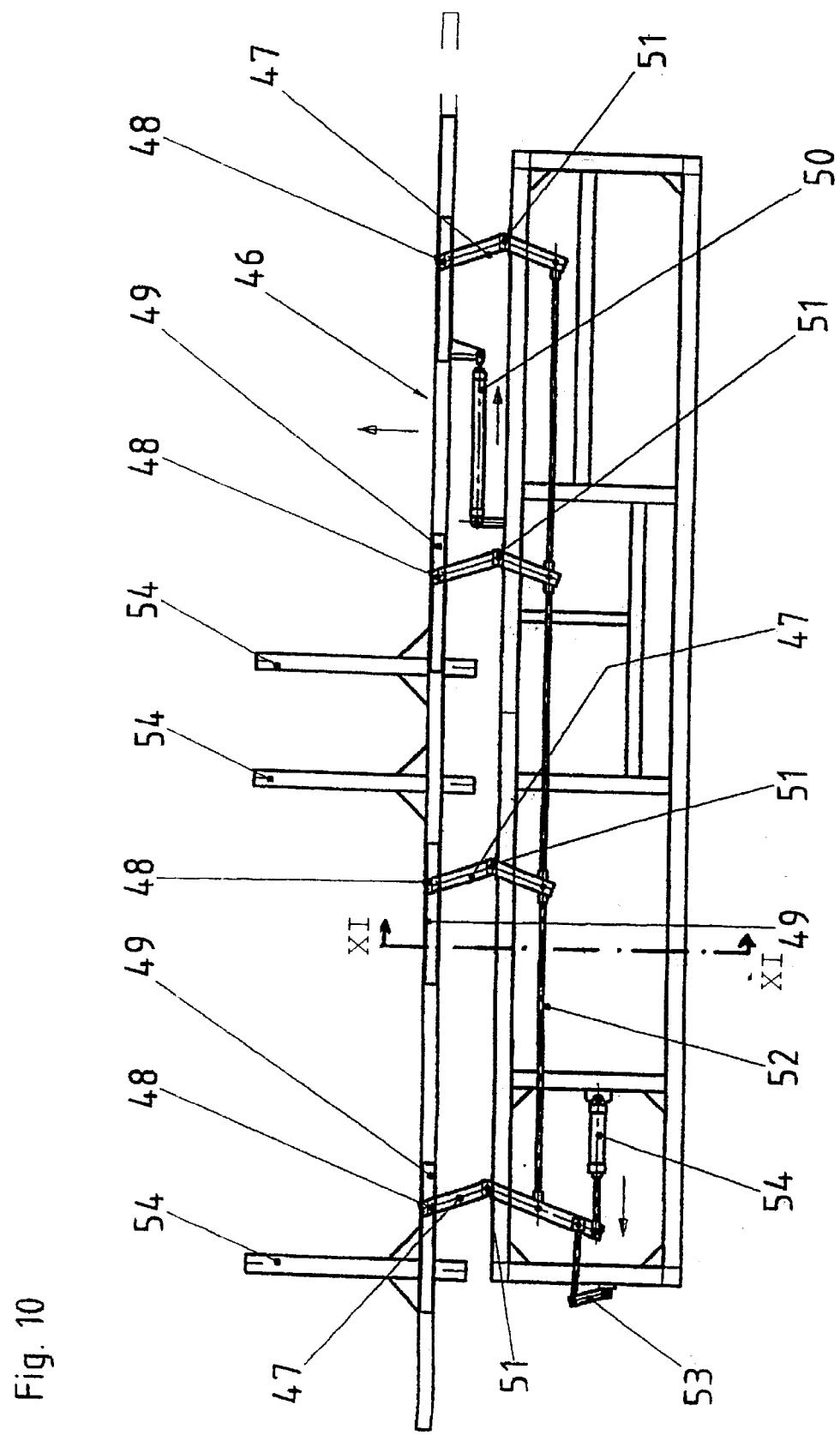
FIG. 10 shows an enlarged view of the lifting and displacement frame arranged in the bath vessel shown in FIG. 9.

The vessel 4 for the electrophoretic application of a topcoat which is illustrated in FIG. 9 has an associated overflow vessel 41, a collection vessel 42 and a run-off slope 43, which leads to the collection vessel 2 and above which two blowers 44, 45 equipped with nozzles are arranged.

In the vessel 4 there is a tray conveyor with a lifting and displacement frame 46. This frame is connected to the ends of a plurality of angled levers 47, the running rollers 48 of which engage in longitudinal slots 49; it can be moved to and fro with the aid of an advancing cylinder 50. The angled levers 47 are, at 51, articulatedly mounted on the bath vessel 4 and are articulatedly connected to one another by means of a linkage 52. Moreover, a guide rod 53 and the piston rod of a lifting cylinder 54 engage on the lower lever arm of an angled lever 47. The lifting and displacement frame 46 can be simultaneously lifted and moved to and fro with the aid of the advancing cylinder 50 and, if appropriate, also the lifting cylinder 54.

Furthermore, the lifting frame is equipped with a plurality of tray manipulators 54, which are used to introduce the trays into the bath and to remove the trays from the bath.

Figure 11:
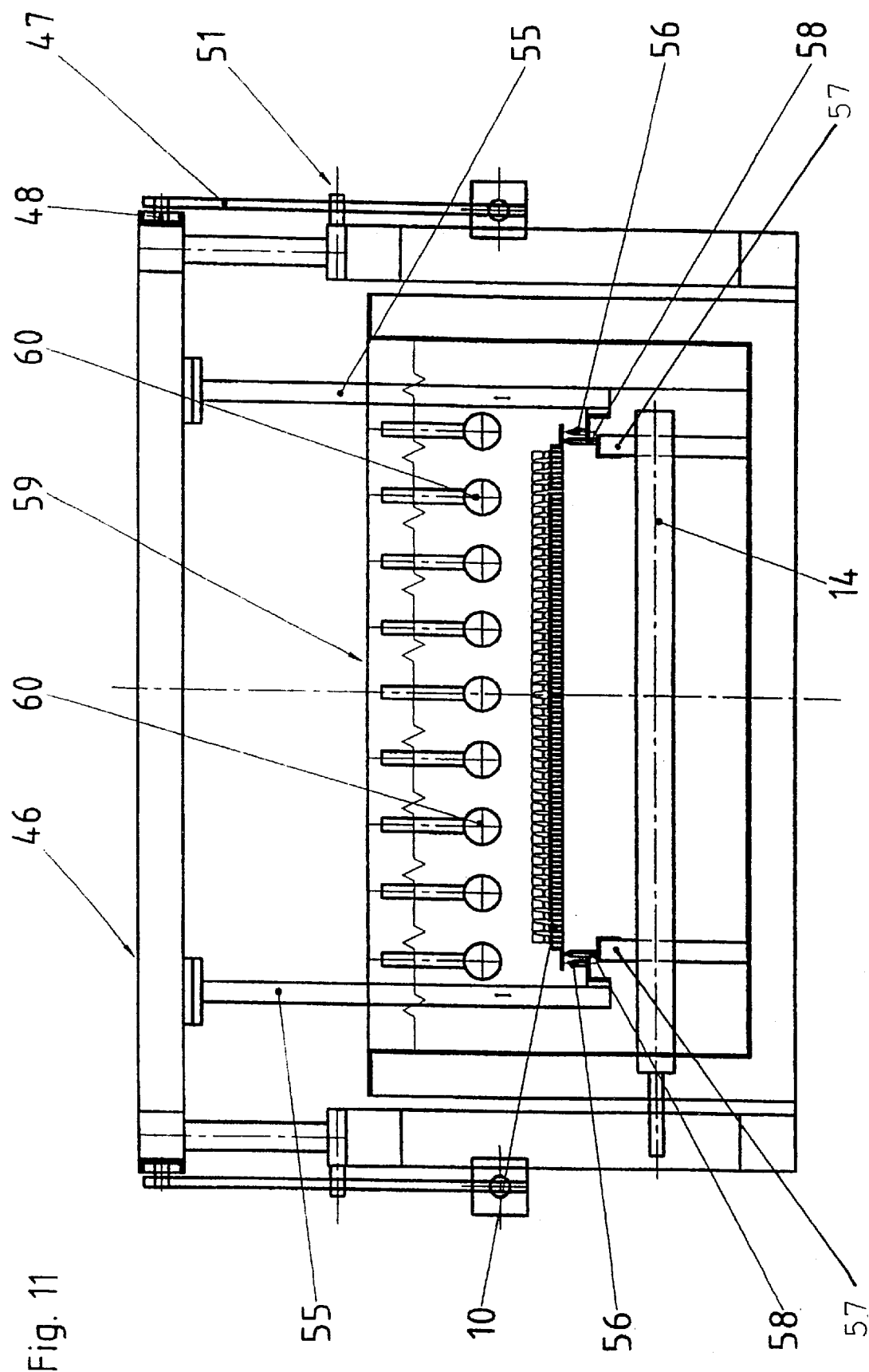
FIG. 11 shows a section on line XI—XI in FIG. 10.
Figure 12:
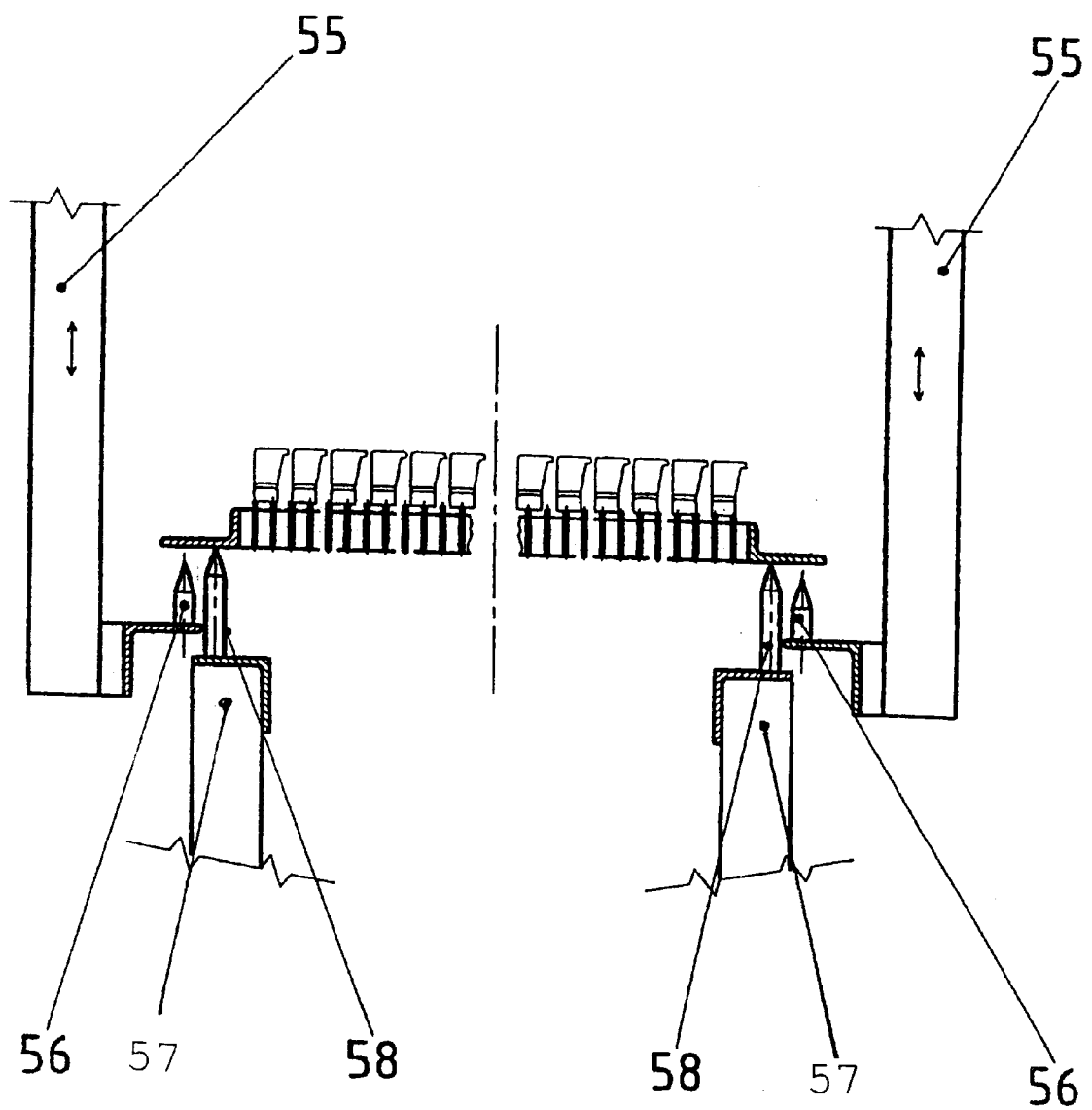
FIG. 12 shows an enlarged view of the tray support in the bath vessel.
Figure 13:
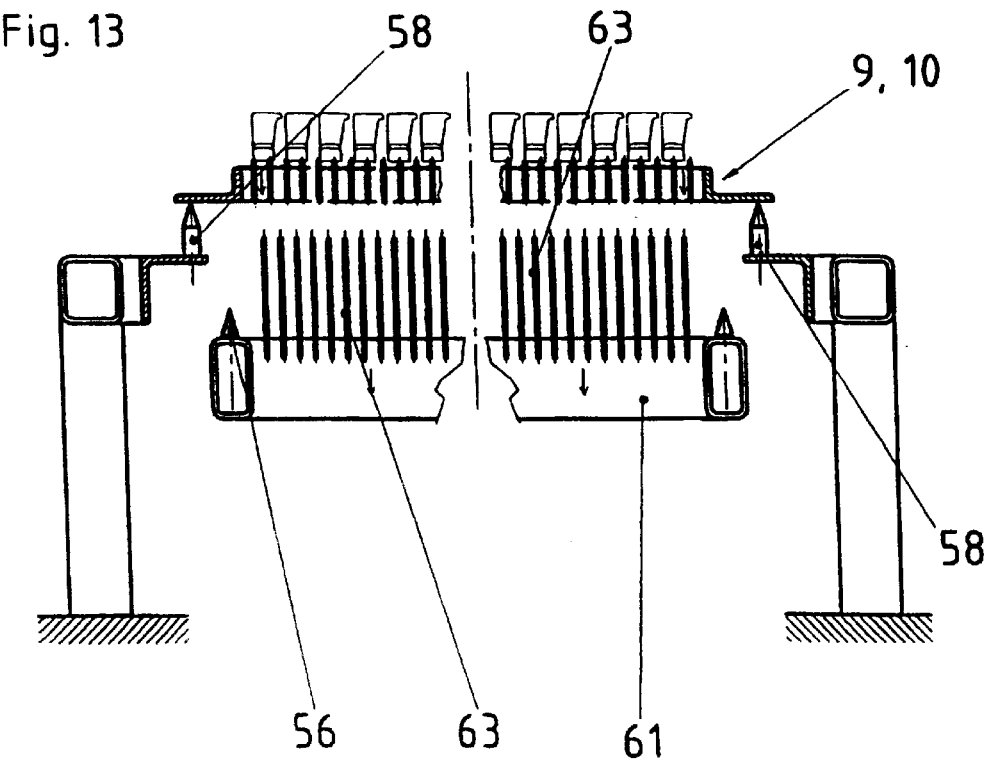
FIG. 13 shows a tray with a lifting table beneath it.

The lifting frame 46 is provided with bearing arms 55, at the lower ends of which bearing pins 56 are arranged. Furthermore, bearing rails 57 with contact pins 58 on which the trays 10 rest while they are at a set position, as shown in FIG. 11, are situated in the bath vessel 4. When the trays 10 are being conveyed from one position to the next, the contact pins 56 of the bearing arms 55 pick up the trays, which are thus always energized via the stationary contact pins 58 or the contact pins 56 which are fixed to the frame. Anodes 14 are arranged beneath the trays 10 and tubular anodes 59, the tubes 60 of which are provided with outlet openings (not shown) for the electrolyte, are arranged above the trays 10.

Figure 14:
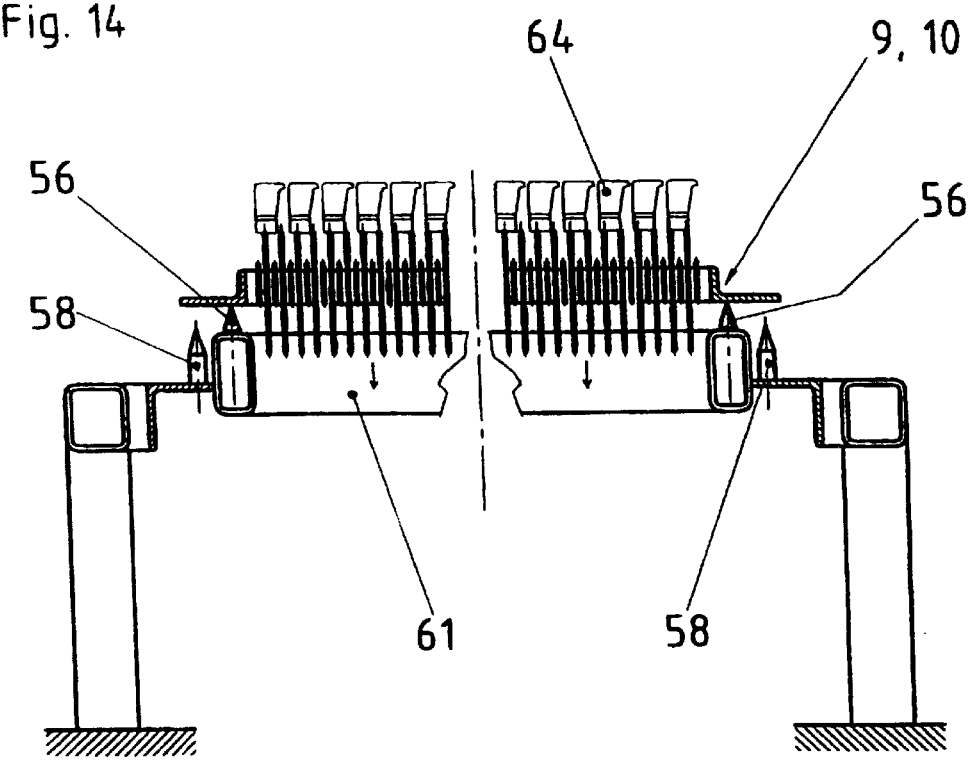
FIG. 14 shows the tray from FIG. 13 with the lifting table raised.
Figure 15:
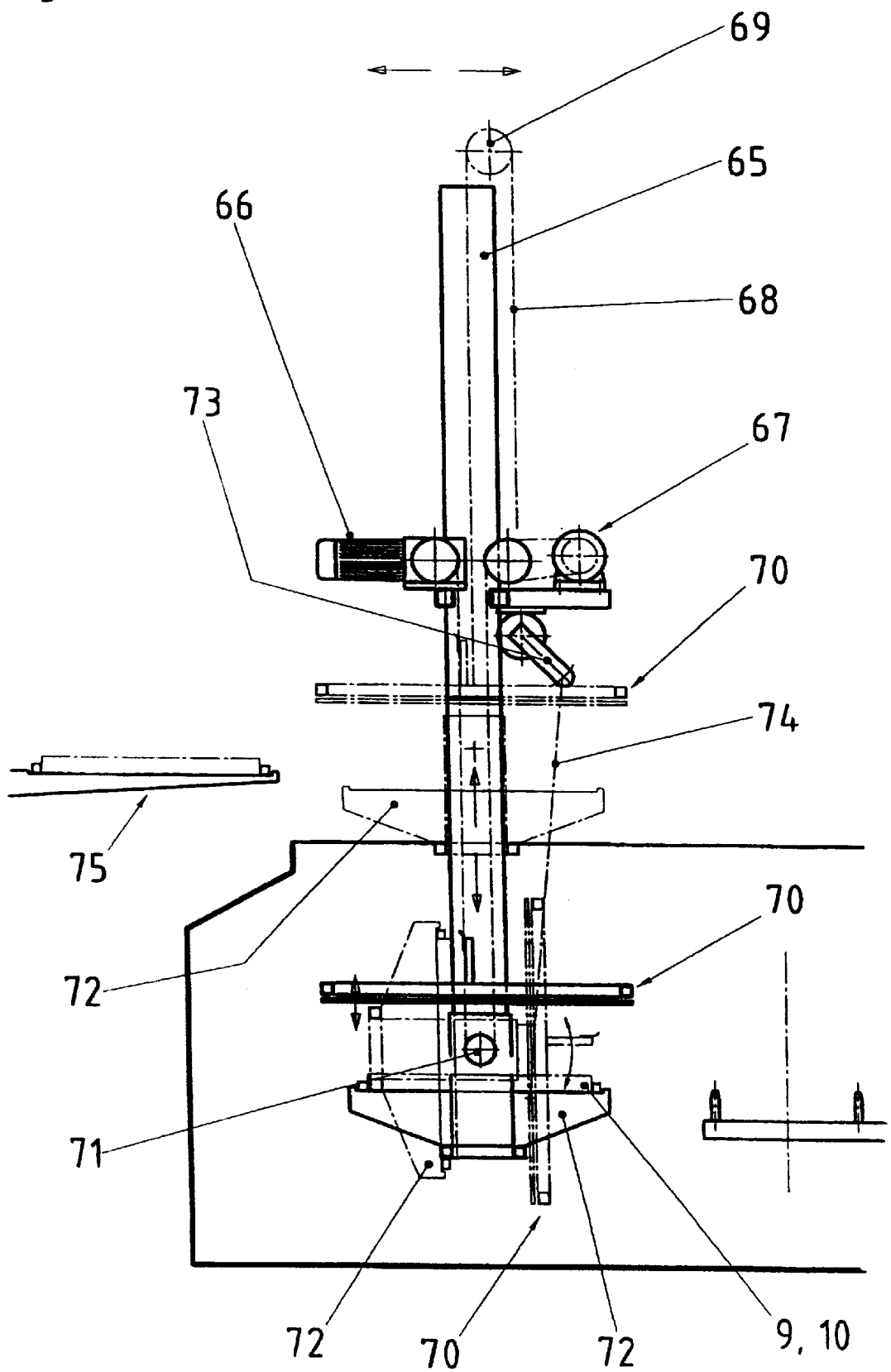
FIG. 15 shows a manipulator for introducing and removing the trays.
Figure 16:
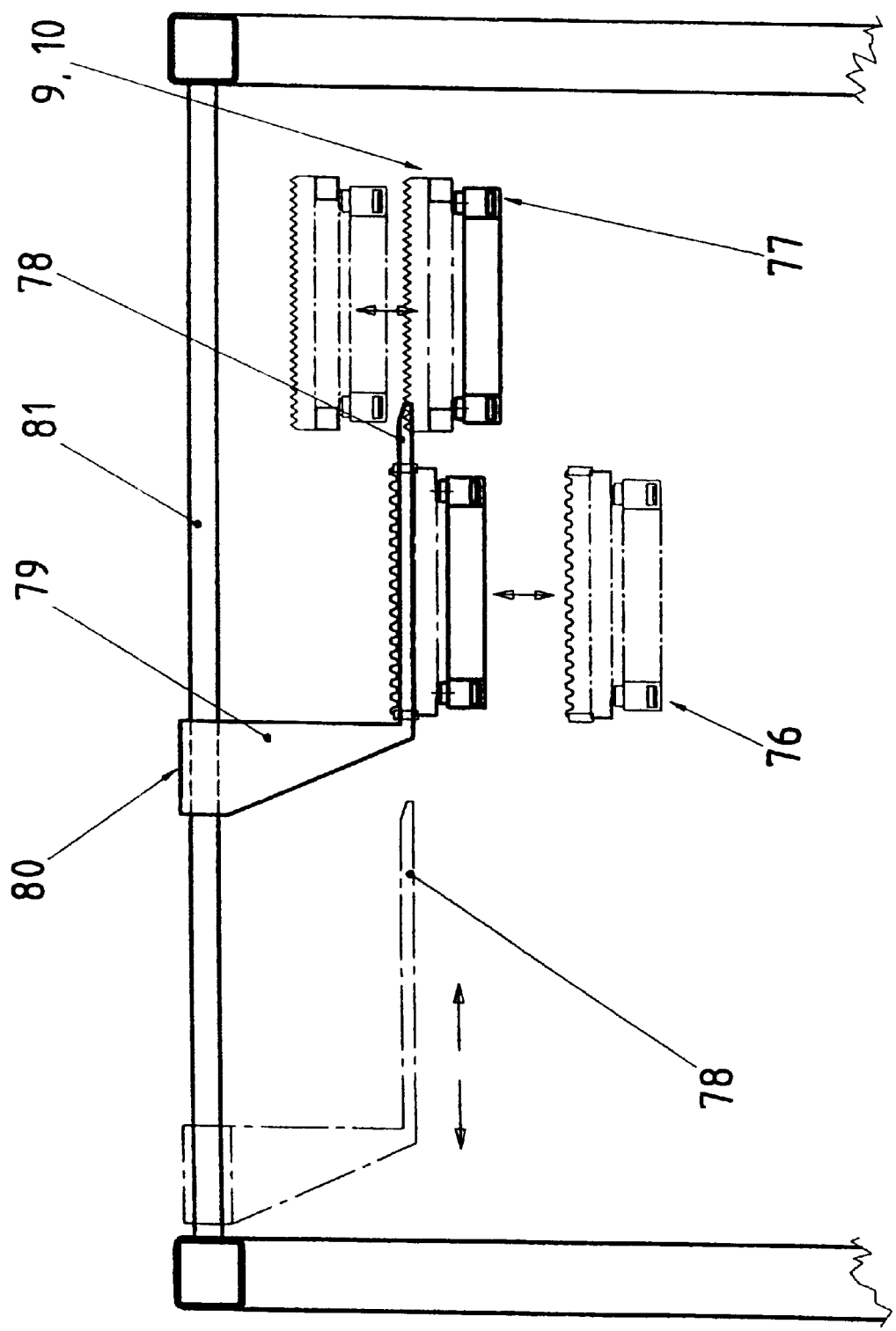
FIG. 16 shows a diagrammatic view of a tray changer.

To enable the material being treated which is situated on the trays to be transferred, a lifting table 61, which is equipped with contact pins 62 and linear bearing means 63, is arranged beneath the movement path of the trays 10. In the event of an upward movement of the lifting table 62, the linear bearing means 83 engage between the cross-bars of the tray 10 and, in this way, lift the material being treated 64 off the cross-bars, as illustrated in FIG. 14. In the process, the contact pins 62 of the lifting table 61 pick up the tray 10 from the stationary contact pins 58, so that the tray is energized without interruption. The material being treated 64 on the tray 10 can be shifted with the aid of a slight relative movement between the lifting table 61 and the tray 10, so that different contact points are created.

The tray manipulators 54 substantially comprise a column 65, which can be raised and lowered with the aid of a lifting drive 66. Furthermore, a cable drive 67, of which a cable 68 is guided over a guide roller 69 at the top end of the column 65 to a holding-down plate 70, is arranged on the column. At the lower end, the column 65 is connected to a tilting bench 72 which can pivot about a pin 71 and with the aid of which a tray 9, 10 can be inclined, so that it can be drip-dried or the material being treated can be immersed in the bath without any bubbles being formed. The tilting bench 72 is actuated with the aid of a driven pivot arm 73 via a Bowden cable 24.

The column 65 can be moved vertically with the aid of the lifting drive 66, and in this way the tray 9, 10 can either be lowered into the bath vessel 1, 2, 3, 4 or moved upward to such an extent that it passes into the region of influence of a removal device 75.

The material being treated can be transferred onto the tray 9, 10 of a lifting table 77 with the aid of a lifting table 76. This takes place with the aid of linear bearing means 78, which, via a bearing arm 79, are connected to a carriage 80 on a driven spindle 81. The linear bearing means 78 move horizontally into the tray situated on the lifting table 77 and, when the lifting table 76 is lowered, pick up the material being treated, which, as a result of further displacement of the linear bearing means 78, is then deposited on the tray 9, 10 of the lifting table 77 of a conveyor arranged in parallel.

Figure 17:
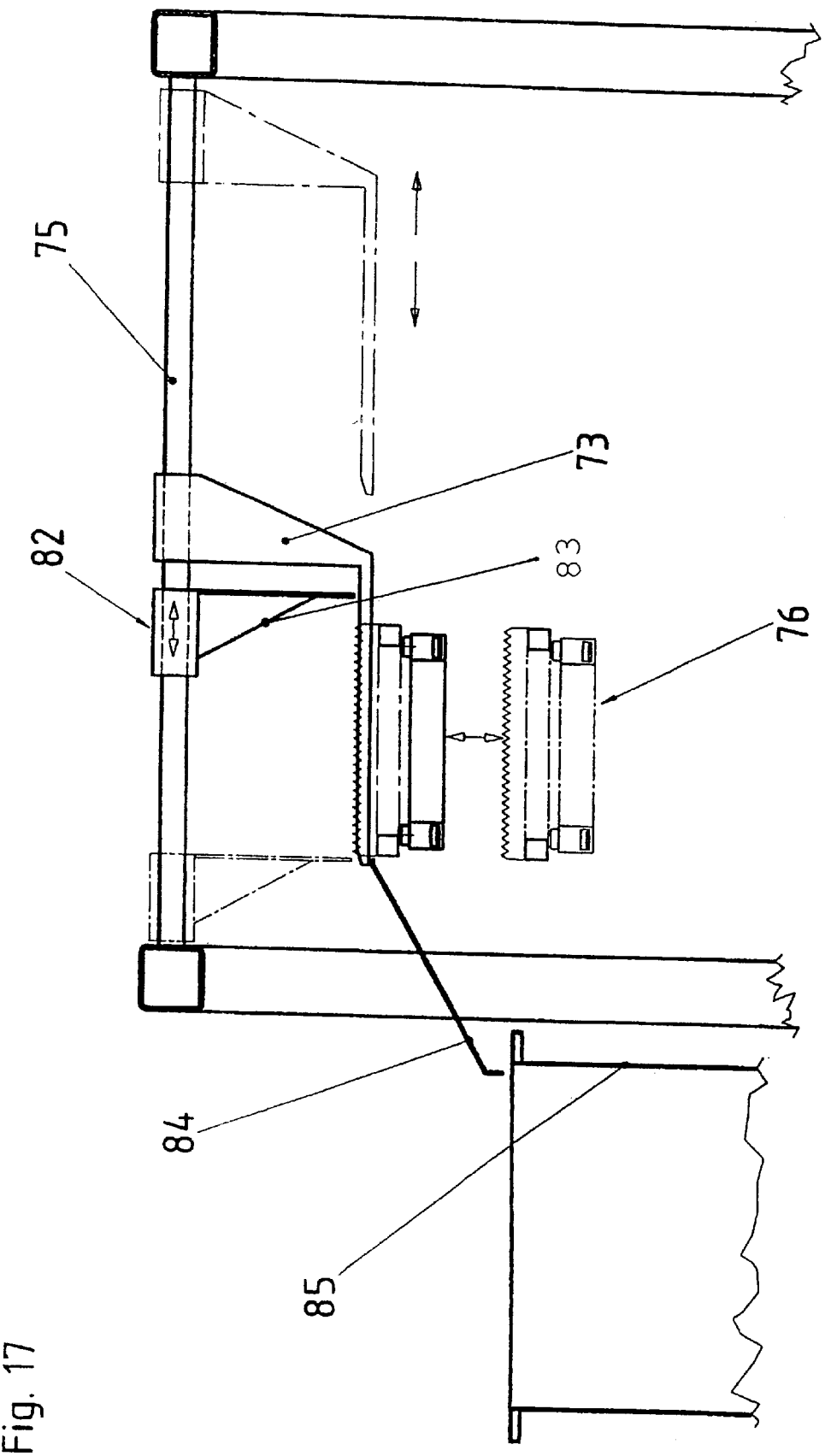
FIG. 17 shows a diagrammatic view of an unloading station.
Figure 18:
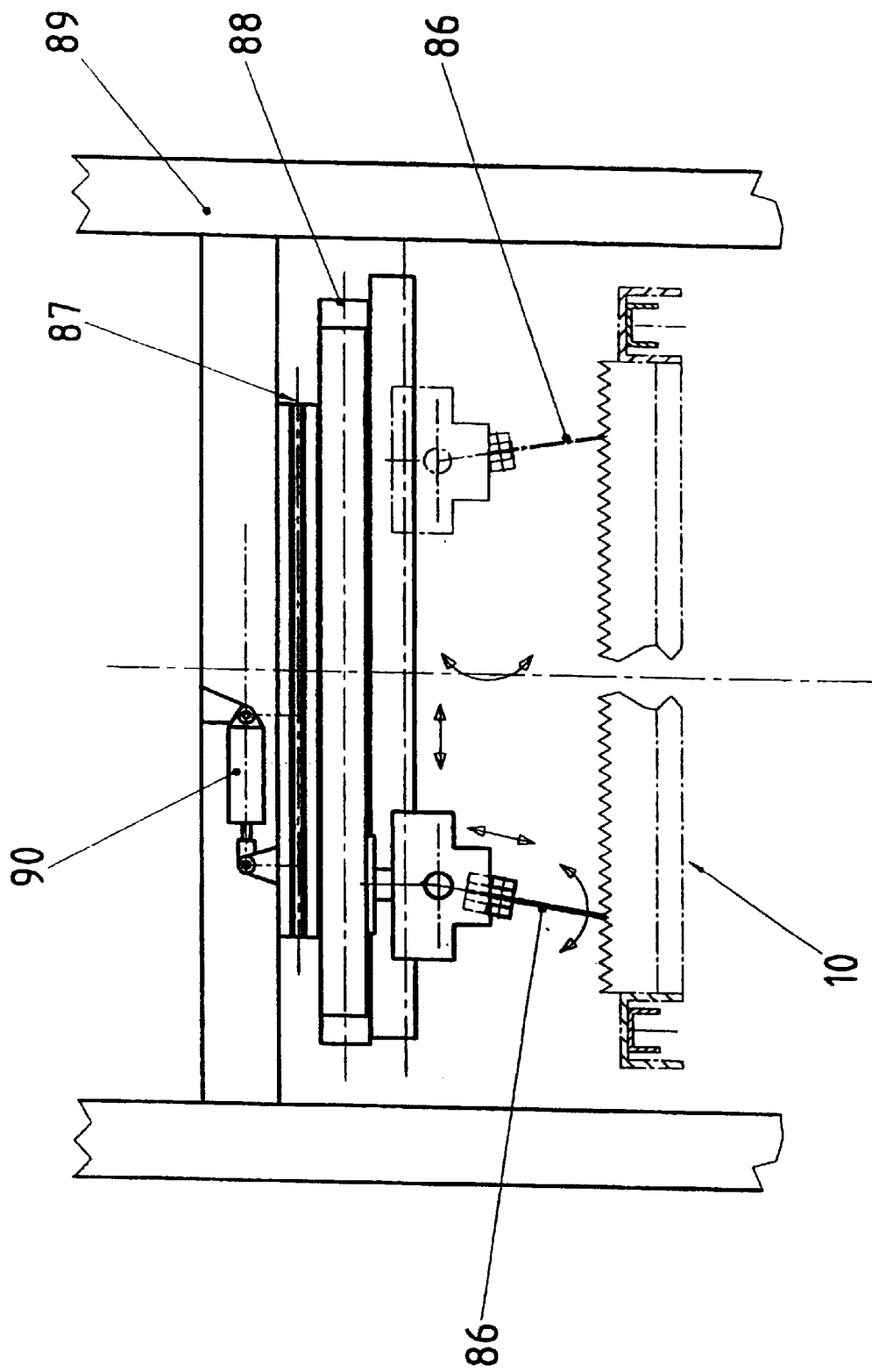
FIGS. 18 to 20 show diagrammatic views of various cleaning stations.

As shown in FIG. 17, the trays are likewise unloaded with the aid of a lifting table 76 and linear lifting means 78, of which a rake 83 arranged on a carriage 82 pushes down the material being treated, which, via a chute 84, passes into a collection vessel 85.

The trays 10 are cleaned with the aid of pivotable spatulas 86 made from thin sheet metal which are arranged on a turning ring 87, on which the piston rod of a turning cylinder 88 engages. The turning ring is mounted displaceably on a frame 89 and can be moved to and fro with the aid of a pushing cylinder 90.

Figure 19:
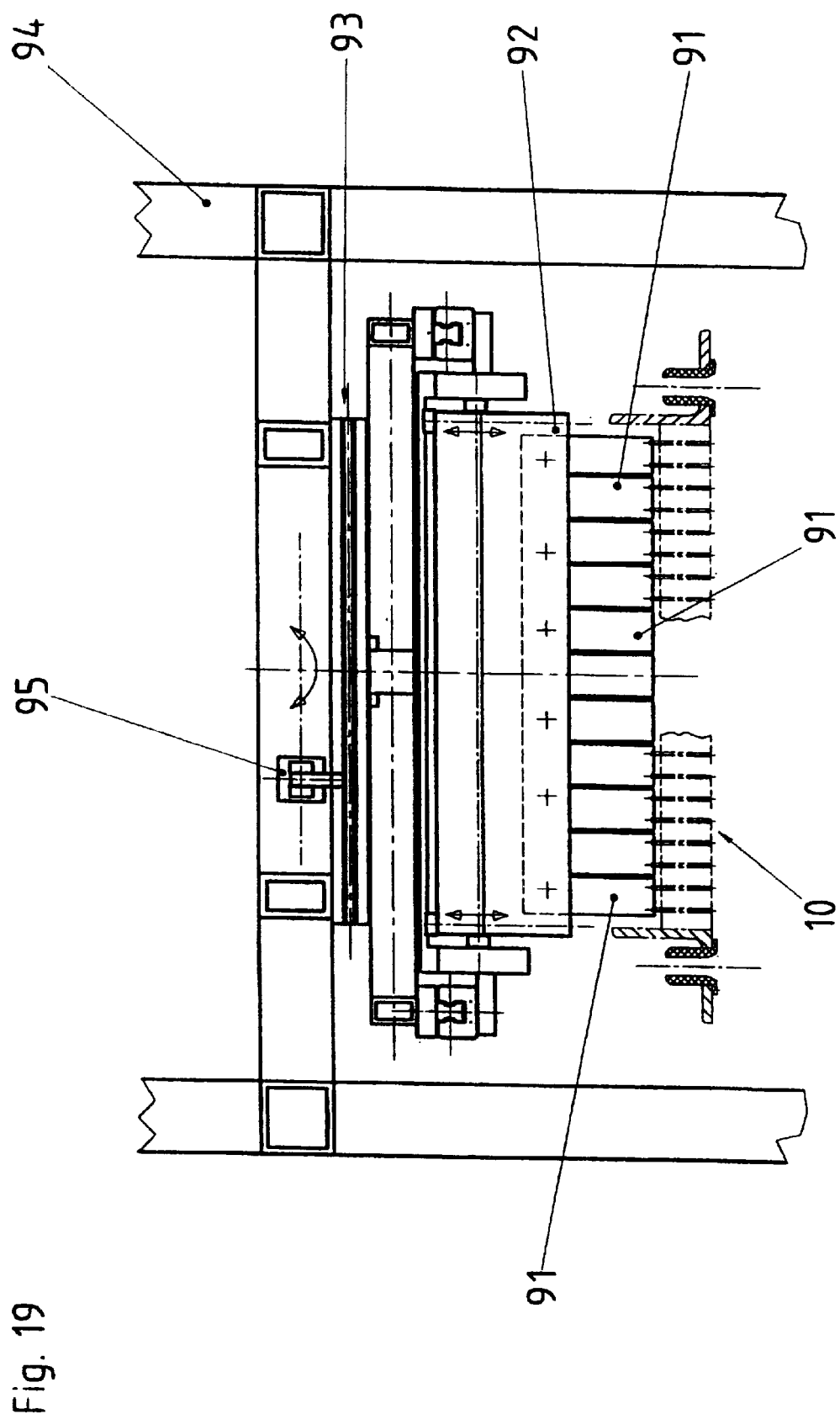
Figure 20:
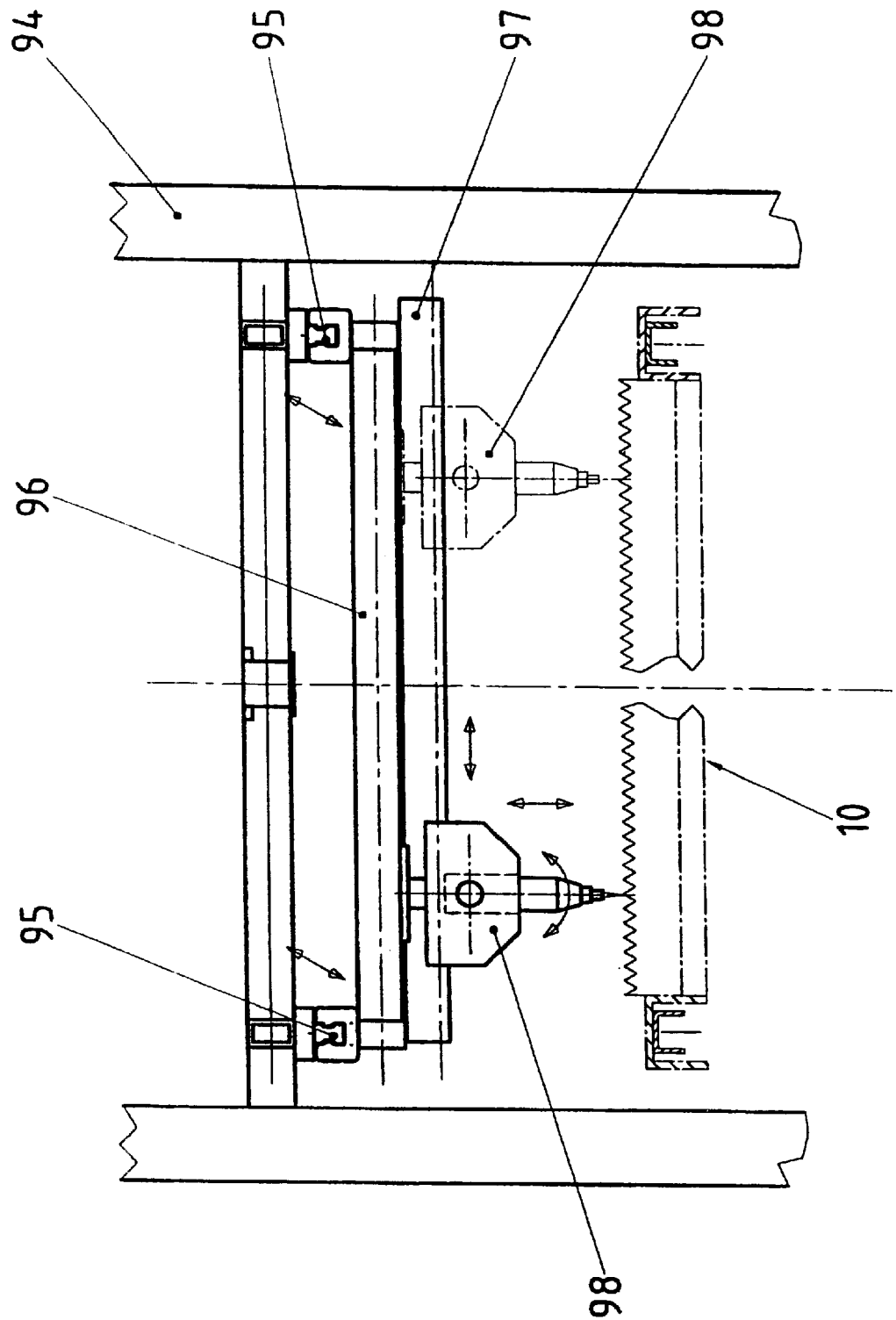

As shown in FIG. 19, it is also possible for a plurality of spatulas 91 to be arranged in a common frame 92 which can be raised and lowered and for its part is mounted in a framework 94 via a turning ring 93 and is turned by means of an adjustment cylinder 95.

Alternatively, the framework 94 may be provided with rails 95 on which a carriage 96 with rails 97 is displaceable, on which cleaning heads 98 are displaceably arranged. The cleaning heads 98 make it possible to clean the trays 10 with the aid of high-pressure water, a mechanically acting blasting means, liquid nitrogen, laser beams or brushes.

What is claimed is:

1. An apparatus for coating goods comprising:
    at least one vessel (4) for a treatment bath;
    a driven lifting and displacement frame (15) comprising grippers (25);
    an upper anode (13); and
    a lower anode (14),
    wherein said grippers move trays (9) containing said goods to be coated between said upper anode (13) and said lower anode (14).

2. The apparatus claimed in claim 1, wherein a pushing drive (16) and a lifting drive (17) act on said lifting and displacement frame (15).

3. The apparatus as claimed in claim 2, wherein said lifting drive comprises a lifting cylinder (17) which acts on a pivot lever (18) and by means of a finger (21, 22) engages in a longitudinal slot (24) in said lifting and displacement frame (15).

4. The apparatus as claimed in claim 2, wherein said trays (9) comprise bearing arms (29) and said at leas one vessel comprises bearing rails (31).

5. The apparatus as claimed in claim 4, wherein said grippers (25) are configured or the bearing arms of said trays.

6. A tray for the apparatus as claimed in claim 1, comprising a frame with cross-bars, and in that the frame(8)and the cross-bars (37) are provided with an electrically insulating coating (39), and the bars are provided with an electrically conductive head wire (38) with an exposed contact strip (40).

7. A tray for the apparatus as claimed in claim 1 comprising lamellae with a sawtooth bearing edge.

8. An apparatus for coating goods comprising:
- at least one vessel (4) for a treatment bath;
- a driven lifting and displacement frame (15) comprising grippers (25);
- a current supply;
- contacting pieces (26); and
- fixed contact pieces (32)
- wherein said grippers (25) move trays (9) containing said goods to be coated, wherein said trays (9) are connected to said current supply through said vessel in a gradual manner, wherein said current supply contacts said trays (9) in an alternating way with said contacting pieces (26) positioned at said driven lifting and displacement frame (15), wherein said configuration results in a continuous current supply in said trays (9).

9. The apparatus as claimed in claim 8, wherein said at least one vessel (4) comprises an upper (13) and a lower horizontal electrode (14).

10. The apparatus as claimed in claim 8, wherein said contacting pieces (26) are arranged on said lifting and displacement frame (15).

11. The apparatus as claimed in claim 8, further comprising two-armed angled levers (47), which by means of one arm engages on said lifting and displacement frame (46) and by means of the other arm connects to one another via a linkage (52).

12. The apparatus as claimed in claim 11, wherein the lifting and displacement frame (46) and one of the angled levers (47) are in each case connected to a dedicated drive (50).

13. The apparatus as claimed in claim 12, wherein the lifting and displacement frame (46) comprise bearing arms (55) for the trays (10).

14. The apparatus as claimed in claim 13, wherein the bearing arms (55) and bearing rails (57) arranged in the vessel (1) are provided with contact pins (56, 58, 62) for receiving the trays (10).

15. The apparatus as claimed in claim 8, further comprising tubular anodes (60) with outlet openings for an electrolyte that are arranged above the trays (9, 10) in the bath vessel (1).

16. The apparatus as claimed in claim 8, further comprising a lifting table (61) with linear bearing means (63) that is arranged in the bath vessel (1).

17. The apparatus as claimed in claim 8, further comprising at least one tray manipulator.

18. The apparatus as claimed in claim 17, wherein the tray manipulator is connected to the lifting and displacement frame (46).

19. The apparatus as claimed in claim 17, wherein the tray manipulator is provided with a displaceable tilting bench (72) and a holding-down device (70).

20. The apparatus as claimed in claim 8, further comprising an unloading station with linear bearing means (78) which can be moved in between the bearing elements of the trays and rakes (43) which can be displaced over the linear bearing means.

21. The apparatus as claimed in claim 8, further comprising a cleaning station with driven cleaning spatulas (86, 91) or displaceable cleaning heads (98).

22. The apparatus as claimed in 8, further comprising an unloading station with linear bearing means which can be moved in between the bearing elements of the trays and rakes which can be displaced over the linear bearing means.

23. The apparatus as claimed in 8, further comprising a cleaning station with driven cleaning spatulas or displaceable cleaning heads.

24. A tray for the apparatus as claimed in claim 8, comprising a frame with cross-bars, and in that the frame (36) and the cross-bars (37) are provided with an electrically insulating coating (39), and the bars are provided with an electrically conductive head wire(38) with an exposed contact strip (40).

25. A tray for the apparatus as claimed in claim 8, comprising lamellae with a sawtooth bearing edge.

* * * * *